(12) United States Patent
Fischer et al.

(10) Patent No.: US 7,836,357 B2
(45) Date of Patent: Nov. 16, 2010

(54) ERROR HANDLING PROCESS

(75) Inventors: Uwe Fischer, Karlsruhe (DE); Olivier Ficatier, Nice (FR); Guillaume Duchene, Antibes (FR)

(73) Assignee: SAP AG, Walldorf (DE)

( * ) Notice: Subject to any disclaimer, the term of this patent is extended or adjusted under 35 U.S.C. 154(b) by 1104 days.

(21) Appl. No.: 11/209,426

(22) Filed: Aug. 23, 2005

(65) Prior Publication Data
US 2006/0064623 A1 Mar. 23, 2006

(30) Foreign Application Priority Data
Sep. 20, 2004 (EP) ................... 04292254

(51) Int. Cl.
*G06F 11/00* (2006.01)
(52) U.S. Cl. ............... 714/48; 714/5; 714/42; 714/49; 714/54; 714/21
(58) Field of Classification Search ............ 714/49, 714/57, 42, 48, 5, 26, 54, 20, 21
See application file for complete search history.

(56) References Cited

U.S. PATENT DOCUMENTS

| | | | |
|---|---|---|---|
| 5,175,735 A | 12/1992 | Dahlby et al. | |
| 5,490,149 A * | 2/1996 | Nylander-Hill | 714/5 |
| 6,038,679 A * | 3/2000 | Hanson | 714/5 |
| 6,334,193 B1 * | 12/2001 | Buzsaki | 714/2 |
| 6,408,407 B1 * | 6/2002 | Sadler | 714/57 |
| 6,742,141 B1 * | 5/2004 | Miller | 714/26 |
| 7,225,367 B2 * | 5/2007 | Hashem et al. | 714/48 |
| 7,296,192 B2 * | 11/2007 | Breitling et al. | 714/49 |
| 7,395,525 B2 * | 7/2008 | Softky | 717/125 |
| 2008/0040635 A1 * | 2/2008 | Larcheveque et al. | 714/49 |

FOREIGN PATENT DOCUMENTS

EP 0 575 066 A 12/1993

OTHER PUBLICATIONS

Anonymous, "Linux Programmer's Manual—UNIX man pages : socket (7)," *UNIXHelp for Users*, May 7, 1995, [online], [retrieved from the Internet May 10, 2005: http://unixhelp.ed.ac.uk/CGI/man-cgi?socket+7], 6 pgs., XP002327758.

Rashid, Richard F., "An Inter-Process Communication Facility for UNIX," *Local Networks for Computer Communications*, West, et al., Eds., *Proceedings of the IFIP Working Group—International Workshop on Local Networks*, Aug. 27, 1980, pp. 319-354, XP000985718.

* cited by examiner

*Primary Examiner*—Yolanda L Wilson
(74) *Attorney, Agent, or Firm*—Schwegman, Lundberg & Woessner, P.A.

(57) ABSTRACT

Correcting errors in data objects includes executing a main process to process the data objects, detecting an error in a first data object via the main process, sending, to an error correcting process, the data object and information associated with the error, and instantiating an instance of the error correcting process to attempt to correct the error. The error correcting process is implemented using substantially a same environment as the main process. The main process continues to execute during and after sending the data object and the information to the error correcting process and while the error correcting process attempts to correct the error.

19 Claims, 2 Drawing Sheets

ERROR HANDLING PROCESS

RELATED APPLICATION

Pursuant to 35 U.S.C. §119, this application claims benefit of European Patent Application 04 292 254.2 that was filed on Sep. 20, 2004, through INPI.

TECHNICAL FIELD

This patent application relates generally to processing by a digital computer. More particularly, the application relates to a computer program that processes data objects, and to ways that the computer program handles errors in those data objects.

BACKGROUND

Errors in computer programs are typically addressed outside the environment (e.g., the user interface ("UI")) of the program. For example, when running a computer program, a user may encounter an error in a data object. In response to the error, the computer program may halt execution and advise the user of the error. In doing so, the computer program may exit from the program's environment (e.g., UI) and force the user to address the error in a different environment (e.g., another UI). This other environment may be unfamiliar to the user, making it difficult to correct the error and return to the main program. Also, halting execution of the computer program can be a disadvantage, particularly if it halts processing of data objects that do not contain errors.

SUMMARY

In a first general aspect, a method comprises executing a main process, detecting an error associated with a data object in the main process, and sending the data object to an error correcting process. The main process may continue to execute during and after sending the data object to the error correcting process. Sending the data object to the error correcting process may comprise storing the data object in a bin associated with the error correcting process, wherein the error correcting process retrieves the data object from the bin.

In some embodiments, the error correcting process comprises an interactive process in which a user initiates correction of the error. The error correcting process may generate a user interface through which the user initiates correction of the error. The user interface may comprise one or more fields containing information associated with the data object; the one or more fields may be editable by the user.

In some embodiments, the error correcting process may comprise an automatic process that attempts to correct the error without user interaction. The automatic process may access a database to obtain information to correct the error, and the automatic process may correct the error using the information obtained from the database. The error correcting process and the main process may be executed using a substantially similar environment. In some embodiments, the error does not substantially interrupt execution of portions of the main process that are not affected by the error.

In some embodiments, the main process comprises a data exchange process to exchange data between two or more entities. The data exchange process may comprise a process to exchange master data between a central repository and a computing device, wherein the master data comprises business objects that are made available to the computing device via the central repository. The method may further comprise instantiating an instance of the error correcting process to correct the error and instantiating a second instance of the error correcting process to correct a second error associated with a second data object in the main process.

In a second general aspect, a system comprises a first computing system that executes a main process to transfer data objects; and a second computing system, in communication with the first computing system, to receive the data objects transferred from the first computing system. The first computing system may detect an error in a data object via the main process; send, to an error correcting process, the data object and information associated with the error; and instantiate an instance of the error correcting process on the first computing system to attempt to correct the error. The error correcting process may be implemented using substantially a same environment as the main process. The first computing system may continue to execute the main process during and after sending the data object and the information to the error correcting process and while the error correcting process attempts to correct the error.

These general and specific aspects may be implemented using a system, an apparatus, a method, or a computer program, or any combination of systems, apparatus, methods, and computer programs.

Advantages of the methods, techniques and systems described herein may include any or all of the following. The main process may continue to execute regardless of what occurs vis-à-vis the error correcting process. More specifically, the main process may continue to execute both before, during and after the error is detected and sent to the error correcting process. In the case of an error, the main process may continue without halting operation and without requiring an immediate exit to address the error.

The details of one or more embodiments of the invention are set forth in the accompanying drawings and description below. Other features, objects, and advantages of the invention will be apparent from the description and drawings, and from the claims.

DESCRIPTION OF THE DRAWINGS

Like reference numerals in different figures indicate like elements.

DETAILED DESCRIPTION

Figure 1:
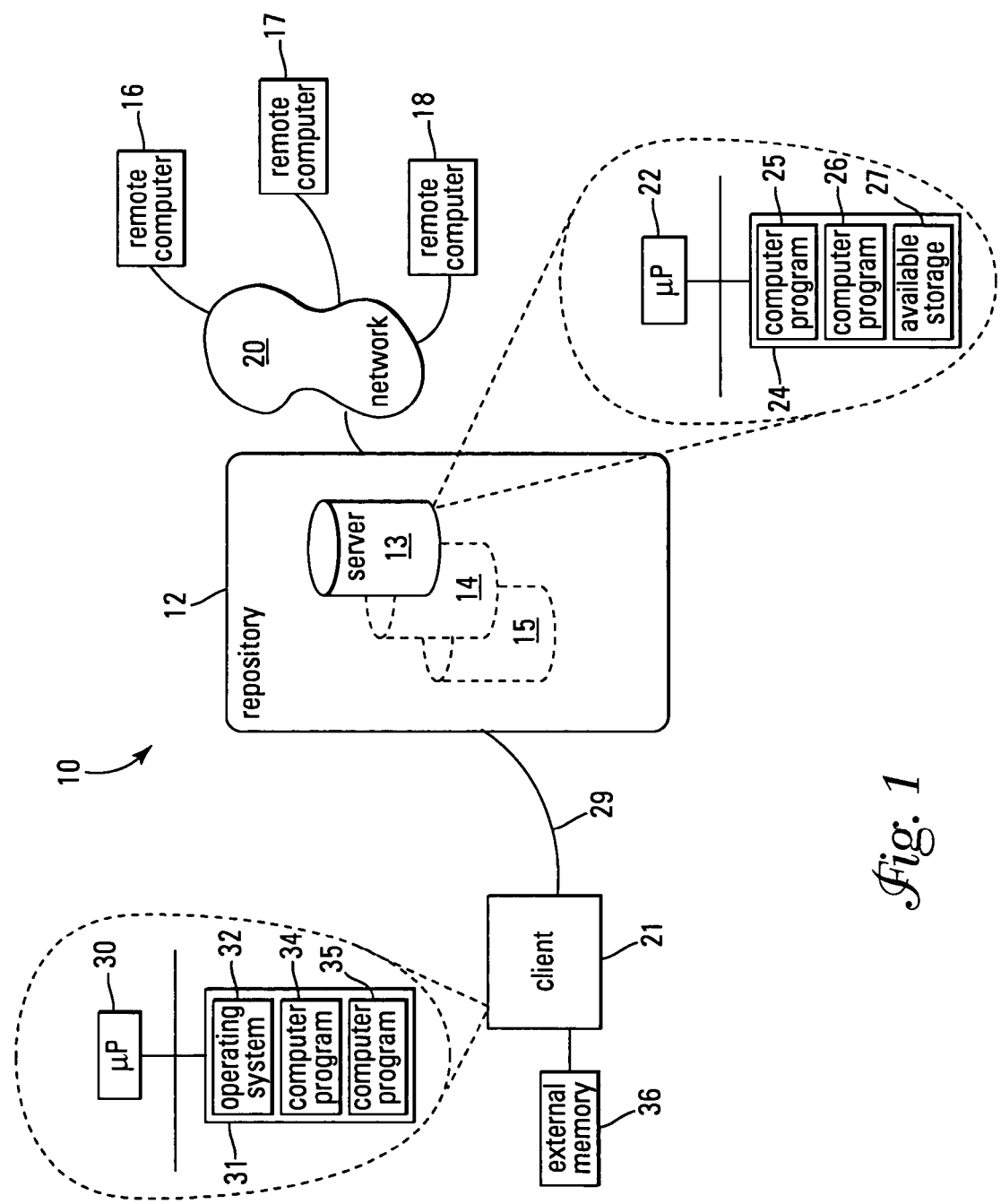
FIG. 1 is a block diagram of hardware on which the error handling process described herein may be implemented.

FIG. 1 shows an example of a computer system 10, on which the error handling process described herein may be implemented. In this regard, it is noted that the error handling process is described below in the context of loading master data into a central repository. The error handling process, however, is not limited to this particular use or implementation. As noted below, the error handling process may be used in the context of any process (e.g., computer program), during data exchange or otherwise.

Referring to FIG. 1, computer system 10 includes a repository 12. Repository 12 may comprise one or more devices, such as one or more servers 13 to 15, which store a library of business objects. These business objects are accessible to one or more remote computers 16 to 18 via a network 20, which provides a communication link between repository 12 and remote computers 16 to 18. The business objects comprise master data of computer system 10. In this context, master data refers to data that is on repository 12 and that is available to remote computers 16 to 18. The master data is typically protected, and original copies thereof cannot typically be changed by the remote computers; although it is noted that the remote computers may, in some circumstances, add to the master data.

As noted above, repository 12 may include one server 13 or multiple servers 13 to 15 (servers 14 and 15 are depicted using dashed lines to indicate that they are optional). In the case of multiple servers, server 13 may act as a controller or "load balancer" for the remaining servers 14 and 15. In this role, server 13 may route data, requests, and instructions between an "external device" (e.g., a remote computer 16 or client 21—described below) and a "slave" server, such as server 14. For example, server 13 may store objects locally until it is full, then route data to a server with available storage, such as server 14. For the purposes of the following description, such internal communications between server 13 and any of its slave servers will be assumed.

Server 13 may be any type of computing device that is capable of receiving and storing data, and of communicating with client 21. As shown in FIG. 1, server 13 includes one or more processors 22 and memory 24 that stores computer programs that are executed by processor(s) 22. In this regard, memory 24 stores a computer program 25 for communicating with remote computers 16 to 18, e.g., to retrieve an object in response to a request from a remote computer, and to send the retrieved object to the remote computer. Memory 24 also stores a computer program 26 for use in loading business objects (e.g., master data) from client 21 into repository 12, and may also contain available storage 27 to store business objects. Alternatively, available storage 27 can be external to server 13.

Remote computers 16 to 18 may be any type of devices, including, but not limited to, desktop or laptop computers, personal digital assistants ("PDAs"), and mobile telephones. Communication is effected over network 20, which may include a local area network ("LAN"), a wide area network ("WAN"), the Internet, a wireless link (e.g., a wireless fidelity, or "Wi-Fi", link), or some combination of the preceding.

Client 21 may be any type of computing device, such as a desktop computer, mainframe, or the like, that is capable of obtaining business objects and of transmitting those business objects to repository 12. A high-speed data link 29, such as Ethernet, connects client 21 to server 13 in repository 12. The connection may be local or remote.

As shown in FIG. 1, client 21 includes one or more processor(s) 30 and memory 31 that stores computer programs that are executed by processor(s) 30. In this regard, memory 31 stores an operating system 32, a computer program 34 that enables communication between client 21 and server 13, and a computer program 35 for implementing a data exchange process that includes, among other things, retrieving and loading business objects into repository 12. The business objects may be stored on client 21; the business objects may be stored in another device, such as an external memory 36; or the business objects may be stored on both client 21 and external device 36.

Figure 2:
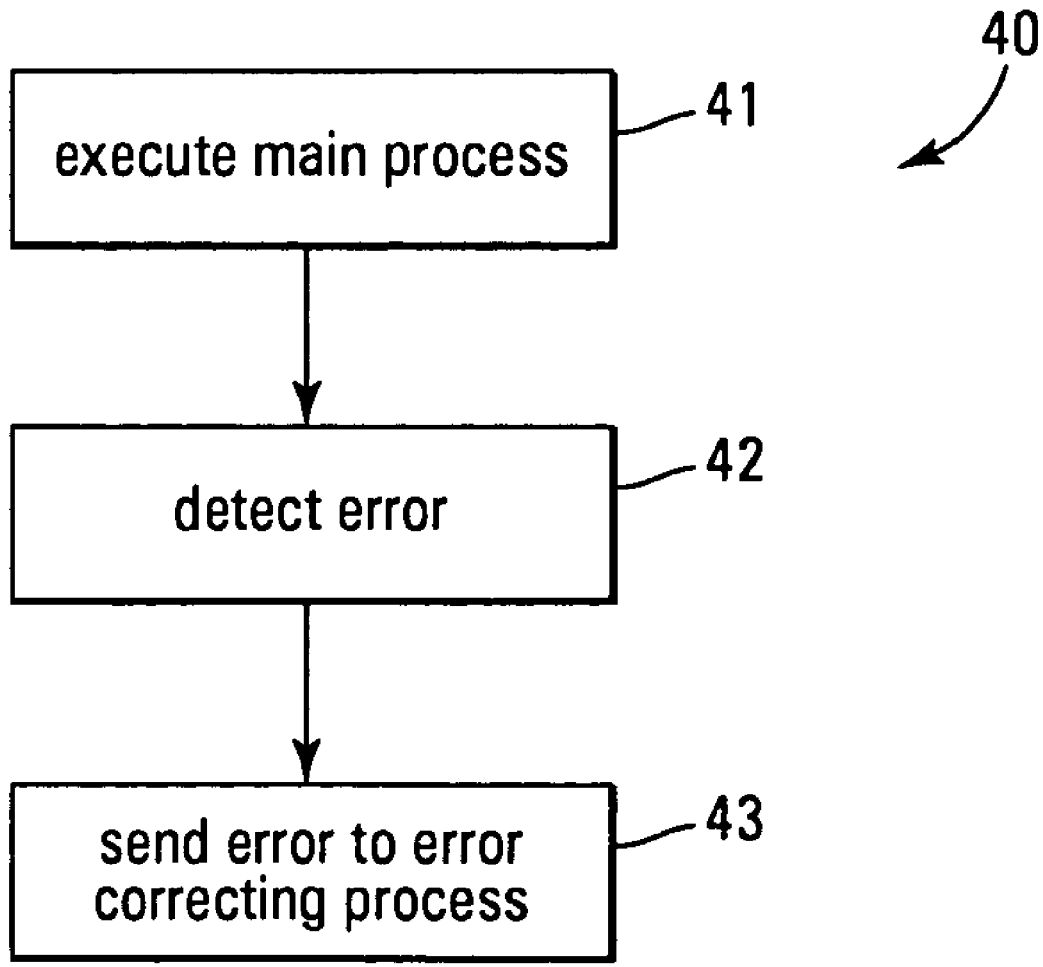
FIG. 2 is a flowchart showing an example of the error handling process described in the context of a data transmission process.

FIG. 2 shows a process 40 that is implemented by computer program 35 to retrieve, and to transmit, business objects from client 21 to server 13, and thereby load those business objects into repository 12. Process 40 includes a "main" process that performs the function of transferring business objects (as opposed to a subsidiary "error correcting" process). In process 40, the main process is executed (41). The main process includes transferring business objects from client 21 to repository 12; although it could also constitute transferring business objects between repository 12 and one or more of the remote computers 16 to 18 (or any other process, for that matter). When the main process is executed, an instance of the error correcting process (not shown) may also be instantiated. This error correcting process collects errors that occur in the main process, and assists in correcting, or attempting to correct the errors, as described below. The error correcting process may be executed on client 21, on repository 12, or on both.

Referring back to process 40, a monitoring process (which may be part of, or separate from, the main process) detects (42) an error in a business object during data exchange. The error may be an error associated with data or code in the business object. For example, the error may constitute an inconsistency between data in the "erroneous" business object and other business objects being transferred, or between the data in the erroneous business object and a database used to perform consistency checks. In any case, when the error is detected, process 40 sends (43) the erroneous business object to a bin associated with the error correcting process. The bin constitutes dedicated storage that the error correcting process checks, when executed.

In addition to the erroneous business object, process 40 may send information relating to the error. The information may include, e.g., an identity of the data or code in the business object that contains the error, an error identifier, or any other information that could be used by the error correcting process to identify an error in a business object.

The main process continues to execute regardless of what occurs vis-à-vis the error correcting process. More specifically, the main process continues to execute both before, during and after the error is detected and sent to the error correcting process. There is no interruption of the main process, except that which is necessary to send the error to the error correcting process, and except perhaps for portions of the main process whose operations are affected by the error. Thus, in contrast to conventional error correcting, process 40 does not halt operation of the main process or require immediate exit to address the error.

The error correcting process may be configured to operate in any manner that is appropriate to the system on which it is executing, or that is desired by a user. For example, the error correcting process may be configured to operate automatically. That is, the error correcting process may check its bin(s) periodically for data objects that contain errors (and for information associated with those errors, if there). The error correcting process may then attempt to resolve the error without input from a user. For example, if data in an object has been indicated as being incorrect or inconsistent, the error correcting process may attempt to correct the error by consulting a database containing the relevant information, performing its own consistency checks on the data, and the like.

If the error correcting process is unable to correct the error automatically, the error correcting process may require input from a user. In this case, the error correcting process becomes interactive, and operates as described below. If the error correcting process is able to correct the error automatically, the error correcting process may transfer the "corrected" data object back to the main process. A message advising of the correction may, or may not, accompany the data object from the error correcting process back to the main process. Alternatively, the error correcting process may transfer the object itself. That is, the error correcting process may send the corrected data object to the server. In still other embodiments, the error correcting process may simply store the corrected data object for later retrieval by the main process or some other process.

In some embodiments, multi-level, or "cascaded" error correction may be implemented. For example, the error correcting process may call other error correcting processes which, in turn, may call other processes, and so on. At the conclusion of each process, the data object may be sent back to the main process, stored for later use, and/or sent directly to the server from the process.

Instead of operating automatically (or in addition to operating automatically), the error correcting process may operate interactively, meaning that it requires user input in order to correct an erroneous data object. For example, the error correcting process may generate a graphical user interface ("GUI") (not shown). The GUI may be displayed to a user, e.g., in the context of the main process controlling data exchange. The GUI may contain a "button" or other type of control, through which a user may initiate error correction. The user may initiate error correction during operation of the main process, e.g., as errors are detected, or the user my wait until the end of the main process.

By way example, a user may "click on" a GUI control using a mouse. In response, the error correcting process may retrieve the erroneous object(s), along with any related information, from its bin(s). The errors in the erroneous object(s) may then be displayed to the user, and the user may be given an opportunity to correct the error(s) interactively. For instance, the GUI may include fields that display information (e.g., names, addresses, telephone numbers, employer, etc.) associated with an erroneous business object. One of the fields may be identified, e.g., by color, as erroneous. The user may then edit the erroneous field to submit correct information to the error correcting process. If the field is blank, the user may simply add the correct information to the field.

If so configured, the error correcting process may perform consistency checks on the newly-entered information (e.g., by reference to a database, as above), and only release the corrected data object back to the main process after its information has been verified. Alternatively, the error correcting process may simply provide the data object, with the newly-entered information, to the main process without performing any checks. In still another alternative, the error correcting process may store the corrected data object either in a database, which may or may not be accessible to client 21, and not send the corrected data object directly back to the main process.

Thus, as described above, the error correcting process may be automatic, interactive, or some combination of automatic and interactive.

In this embodiment, the error correcting process may be implemented with an environment that is substantially similar to the environment of the main process (in the above example, the data exchange process). An "environment", in this context, may include, but is not limited to, the "look and feel" of user interfaces, language for interacting with the process (e.g., French, English, German, etc.), similar installation and configuration options, etc. Basically, the environment relates to the familiarity of a user with a program. Similar technology may be used to implement the similar environments, e.g., similar hardware, software, computing languages, etc. Alternatively, different underlying technology may be used to implement the similar environments of the error correcting process and the main process, with the end result being transparent to the user.

In this embodiment, each time an instance of the error correcting process is called upon to correct an error, a new instance is instantiated. This new instance receives information from the main process in the manner described above. In other embodiments, different instances of the error correcting process may not be used.

Process 40 and its associated error correcting process (referred to collectively as "the error handling process") are not limited to use with the hardware and software described above; they may find applicability in any computing or processing environment and with any type of machine that is capable of running machine-readable instructions.

The error handling process can be implemented in digital electronic circuitry, or in computer hardware, firmware, software, or in combinations thereof. The error handling process can be implemented via a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the error handling process can be performed by one or more programmable processors executing a computer program to perform the functions of the error handling process. The method steps can also be performed by, and the error handling process can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory (ROM) or a random access memory (RAM) or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuit, such as that noted above.

The error handling process can be implemented in a computing system that includes a back-end component, e.g., as a data server, or that includes a middleware component, e.g., an application server, or that includes a front-end component, e.g., a client computer having a GUI or a Web browser through which a user can interact with an implementation of the error handling process, or any combination of such back-end, middleware, or front-end components. The components of the system can be interconnected by any form or medium of digital data communication, e.g., a communication network. Examples of communication networks include a LAN, a WAN and/or the Internet.

The error handling process is not limited to use in a data exchange context, or to use with exchanging data or master data, business objects, or any of the specific implementation details set forth herein. The error handling process has broad applicability, and can be used in the context of any computer program that is capable of detecting errors and of sending information relating to those errors to an error correcting process. The error correcting process is likewise not limited to the implementation details set forth herein, and can be configured in any manner to correct any number and variety of errors.

Method steps associated with the error handling process can be rearranged and/or one or more such steps can be omitted to achieve the same results described herein. As noted, the error handling process may be fully automated, meaning that it operates without user intervention, or interactive, meaning that all or part of the error handling process may include some user intervention.

Elements of different embodiments described herein may be combined to form other embodiments not specifically set forth above. Other embodiments not specifically described herein are also within the scope of the following claims.

What is claimed is:

1. A method comprising:
   executing a main process of a computer program, the main process to transfer a data object;
   detecting, electronically, an error associated with the data object to be transferred in the main process; and
   storing the data object in a bin associated with an error correcting process, the error correcting process retrieving the data object from the bin;
   wherein the main process continues to execute during and after sending the data object to the error correcting process.

2. The method of claim 1, wherein the error correcting process comprises an interactive process in which a user initiates correction of the error.

3. The method of claim 2, wherein the error correcting process generates a user interface through which the user initiates correction of the error.

4. The method of claim 3, wherein the user interface comprises one or more fields containing information associated with the data object, the one or more fields being editable by the user.

5. The method of claim 1, wherein the error correcting process comprises an automatic process that attempts to correct the error without user interaction.

6. The method of claim 5, wherein the automatic process accesses a database to obtain information to correct the error, the automatic process correcting the error using the information obtained from the database.

7. The method of claim 1, wherein the error correcting process and the main process are executed using a substantially similar environment.

8. The method of claim 1, wherein the error does not substantially interrupt execution of portions of the main process that are not affected by the error.

9. The method of claim 1, wherein the main process comprises a data exchange process to exchange data between two or more entities.

10. The method of claim 9, wherein the data exchange process comprises a process to exchange master data between a central repository and a computing device, the master data comprising business objects that are made available to the computing device via the central repository.

11. The method of claim 1, further comprising instantiating an instance of the error correcting process to correct the error and instantiating a second instance of the error correcting process to correct a second error associated with a second data object in the main process.

12. A computer program product tangibly embodied in an information carrier, the computer program product comprising instructions that cause a machine to:
   execute a main process of a computer program, the main process to transfer a data object;
   detect an error associated with the data object to be transferred in the main process; and
   store the data object in a bin associated with an error correcting process, the error correcting process to retrieve the data object from the bin;
   wherein the instructions cause the machine to continue to execute the main process during and after sending the data object to the error correcting process.

13. The computer program product of claim 12, wherein the error correcting process comprises an automatic process that attempts to correct the error without user intervention.

14. The computer program product of claim 13, wherein the automatic process accesses a database to obtain information to correct the error, the automatic process correcting the error using the information obtained from the database.

15. The computer program product of claim 12, wherein the error does not substantially interrupt execution of portions of the main process that are not affected by the error.

16. A computer program product tangibly embodied in an information carrier for use in correcting errors in data objects, the computer program product comprising instructions that cause machine to:
   execute a main process of a computer program, the main process to process the data objects;
   detect an error in a first data object to be processed via the main process;
   storing the first data object and information associated with the error in a bin associated with an error correcting process, the error correcting process being implemented using substantially a same environment as the main process; and
   instantiate an instance of the error correcting process to attempt to correct the error;
   wherein the main process continues to execute during and after sending the first data object and the information to the error correcting process and while the error correcting process attempts to correct the error.

17. The computer program product of claim 16, wherein the instance of the error correcting process operates in response to a user input or automatically without regard to user input.

18. The computer program product of claim 16, wherein the main process comprises a process to exchange master data between a central repository and a computing device, the master data comprising business objects that are made available to the computing device via the central repository, the main process comprising a monitoring process to detect the error.

19. A system comprising:

a first computing system that executes a main process of a computer program, the main process to transfer data objects; and a second computing system, in communication with the first computing system, to receive the data objects transferred from the first computing system;

wherein the first computing system:

detects an error in a data object to be transferred via the main process;

stores the data object and information associated with the error in a bin associated with an error correcting process, the error correcting process being implemented using substantially a same environment as the main process; and instantiates an instance of the error correcting process on the first computing system to attempt to correct the error;

wherein the first computing system continues to execute the main process during and after sending the data object and the information to the error correcting process and while the error correcting process attempts to correct the error.

\* \* \* \* \*